Patented Aug. 17, 1937

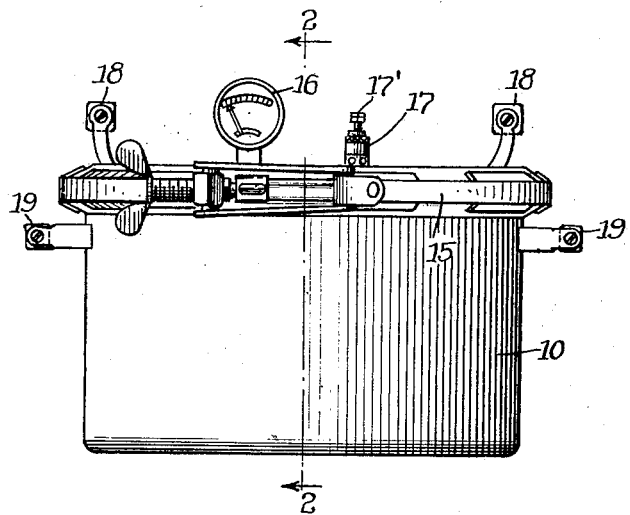
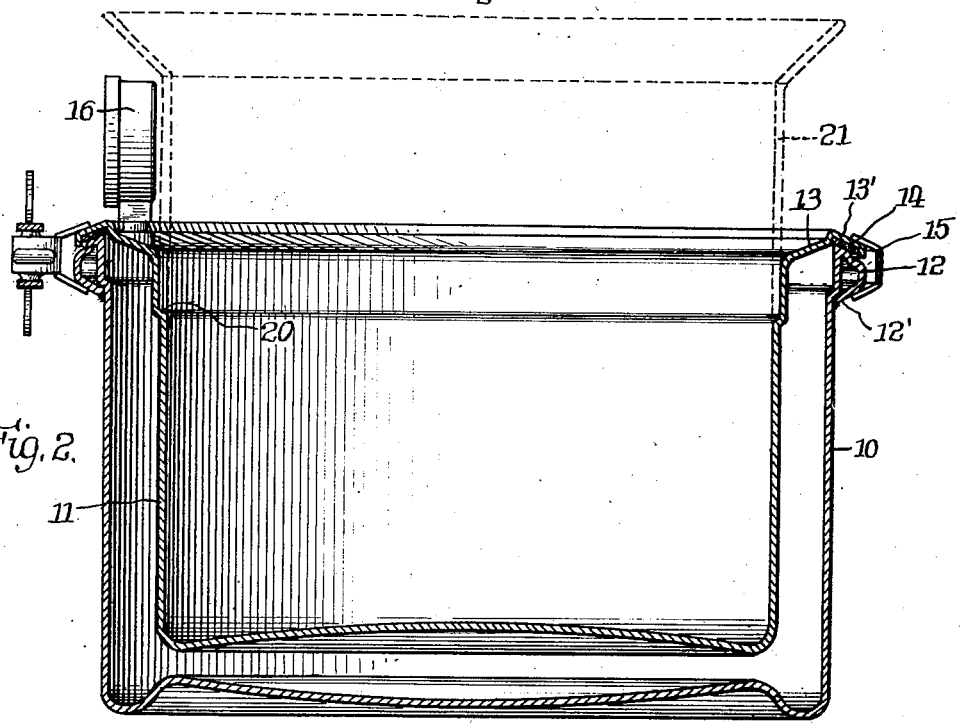

2,090,182

UNITED STATES PATENT OFFICE 2,090,182

DOMESTIC COOKING UTENSIL

Clarence B. Burpee, Chicago, Ill., assignor to Burpee Can Sealer Company, Chicago, Ill., a corporation of Illinois Application April 12, 1934, Serial No. 720,183

1 Claim. (Cl. 53—1)

This invention pertains to the art of domestic cooking utensils, and has reference more particularly to cooking vessels employed in the making of jams, jellies, syrups, candies, and like edibles, which, for their proper preparation, require the elimination of a considerable amount of water from the raw stock in the cooking operation. Such materials, moreover, when cooked in an ordinary boiler, require constant close attention and frequent stirring to avoid burning, and the dehydration of the stock to the proper point is a slow process, especially when performed in a double boiler to avoid danger of burning.

The article of my present invention is based on the broad principle of the double boiler, but with certain modifications thereof designed to effect the main purpose or object of the invention, which is to provide an improved cooking utensil, more especially although not exclusively for edibles such as those above named, which will avoid the necessity of stirring during the cooking operation, will avoid all danger of burning, and will effect the required dehydration much more speedily than is possible with cookers now known and used.

One practical embodiment of the invention is illustrated in the accompanying drawing in which:—

Fig. 1 is a side elevation of the utensil.

Fig. 2 is an enlarged vertical section of the same, viewed on the line 2—2 of Fig. 1.

Referring to the drawing, 10 designates an outer vessel, and 11 an inner vessel of somewhat less diameter and depth than the outer vessel adapted to occupy a position within the outer vessel such as is shown in Fig. 2. The outer vessel 10 is formed on its upper edge with an external rolled bead 12 formed with a tapered lower edge portion 12', and the inner vessel 11 is formed on its upper edge with an outwardly directed annular flange 13, the outer portion 13' of which is oppositely tapered to the lower portion of the bead 12. The under side of the flange portion 13' is shaped to form a seat for a gasket ring 14 that seats on the top edge of the bead 12.

Embracing the tapered portions 12' and 13' of the bead 12 and flange 13 respectively is a removable clamp ring 15. Any suitable and efficient clamp ring that will effect a steam and water tight joint between the upper ends of the vessels 10 and 11 may be employed, but I have herein shown a clamp ring forming the subject matter of Letters Patent 1,901,699 granted March 14, 1933, to Frank W. Burpee, to which patent reference may be had for a disclosure of the structural details.

The utensil is also preferably equipped with a steam pressure gauge 16 and a vent valve 17, both of which are mounted on the flange 13 and communicate with the annular space between the vessels 10 and 11, which space is partially filled with water when the utensil is in use. The vent valve 17 is of that type wherein the valve member may be adjusted to open at a predetermined steam pressure, and is also provided with a stem 17' by which the valve may be opened when the cooking operation is completed and the remaining steam has condensed in order to vent the vacuum within the steam chamber so that the inner vessel may be readily lifted out.

The inner vessel 11 is also equipped with a pair of oppositely disposed handles 18 soldered or otherwise attached to the flange 13, by which the vessel may be lifted, lowered and poured; and the outer vessel 10 is also equipped below the bead 12 with a pair of handles 19.

When using the ordinary double boiler, it is, of course, impossible to obtain a higher cooking temperature than 212° F.—the boiling point of water. But, when using my improved utensil, the cooking temperature can be run up to around 240° F. or 250° F. As hereinbefore stated, the cooking of such edibles as jams, jellies, candies, syrups, and the like, involves the boiling off of a large percentage of the moisture contained in the stock; and the higher the cooking temperature to which the stock is subjected, the more rapid will be the dehydration of the stock, thus shortening the time period of the cooking operation. At the same time, the described construction prevents any possibility of accidental burning, so that the material does not require to be stirred.

The inner vessel 11 may be formed, slightly below its upper end, with an internal annular ledge or shoulder 20 to seat an extension collar 21 indicated by dotted lines in Fig. 2. It is well known that when cooking viscous substances, if the vessel containing the same be nearly filled, bubbles will creep up the sides of the vessel and sometimes spill over the top edge, and hence the purpose of the shoulder 20 is to permit the use of an extension collar which has the effect of increasing the height of the vessel 11 so as to prevent any bubbling or boiling over of the contents. The use of such an extension collar on ordinary cooking vessels is, however, old and known, and no claim thereto, per se, is made herein.

It is believed that the novel structural features of the invention will be fully understood from the foregoing description taken in connection with the drawing, and the manner in which the utensil effects the stated objects of the invention,—namely, the shortening of the cooking period and the elimination of all danger of burning, will be apparent to persons familiar with the use of cooking vessels of this character. In practice the outer and inner vessels are preferably made of sheet metal, such as aluminum or steel, but of course the particular materials of which the vessels are made are not at all of the essence of the invention; and the structural details disclosed may also be varied within the scope and purview of the appended claim.

I claim:

In a cooking utensil of the character described, the combination of an outer vessel formed with a bead on its top edge, a removable inner vessel of less diameter and depth than said outer vessel spaced throughout its full height from the latter and formed with an external flange on its top edge seated on said bead, an annular gasket between said flange and bead, a removable clamp ring embracing said flange and bead for effecting a water and steam tight joint between the upper ends of said vessels, and a steam pressure gauge and a vent valve both mounted on said flange and communicating with the space between said vessels.

CLARENCE B. BURPEE.